United States Patent
Moriguchi et al.

(10) Patent No.: US 10,139,241 B2
(45) Date of Patent: Nov. 27, 2018

(54) INFORMATION PROVISION SYSTEM, INFORMATION PROVISION METHOD, AND MANAGEMENT DEVICE (71) Applicant: YAMAHA CORPORATION, Hamamatsu-shi (JP)

(72) Inventors: Shota Moriguchi, Tokyo (JP); Takahiro Iwata, Tokyo (JP)

(73) Assignee: YAMAHA CORPORATION, Hamamatsu-shi (JP)

(*) Notice: Subject to any disclaimer, the term of this patent is extended or adjusted under 35 U.S.C. 154(b) by 0 days.

(21) Appl. No.: 15/653,978

(22) Filed: Jul. 19, 2017

(65) Prior Publication Data
US 2017/0314952 A1 Nov. 2, 2017

Related U.S. Application Data (63) Continuation of application No. PCT/JP2016/051891, filed on Jan. 22, 2016.

(30) Foreign Application Priority Data

Jan. 23, 2015 (JP) .................................. 2015-011651

(51) Int. Cl.
G01C 21/36 (2006.01)
G06Q 30/02 (2012.01)
(Continued)

(52) U.S. Cl.
CPC ..... *G01C 21/3629* (2013.01); *G06F 17/3074* (2013.01); *G06F 17/30244* (2013.01);
(Continued)

(58) Field of Classification Search
CPC ...... G06Q 30/02; G01C 21/3629; H04B 7/26; H04L 12/00; G06F 17/3074; G06F 17/30244
See application file for complete search history.

(56) References Cited

U.S. PATENT DOCUMENTS 8,942,388 B2    1/2015  Akiyama et al.
2008/0014909 A1* 1/2008  Shimomura ........... G07C 5/008
                                                        455/414.1
(Continued)

FOREIGN PATENT DOCUMENTS

JP    2002351905 A    12/2002
JP    2003319070 A    11/2003
(Continued)

OTHER PUBLICATIONS

International Search Report issued in Intl. Appln. No. PCT/JP2016/051891 dated Apr. 19, 2016. English translation provided.
(Continued)

*Primary Examiner* — Tan Q Nguyen
(74) *Attorney, Agent, or Firm* — Rossi, Kimms & McDowell LLP (57) ABSTRACT An information provision system includes provision instruction means for generating a provision instruction to provide a content associated with a guidance voice every emission of the guidance voice, and information distribution means for transmitting distribution information for reproducing the content related to the provision instruction, to a mobile terminal registered as a target of provision of the content associated with the guidance voice.

11 Claims, 6 Drawing Sheets (51) Int. Cl.
  *G06F 17/30* (2006.01)
  *H04B 7/26* (2006.01)
  *G09B 5/12* (2006.01)
  *G06Q 50/30* (2012.01)
  *H04W 4/02* (2018.01)

(52) U.S. Cl.
  CPC ............ *G06Q 30/02* (2013.01); *G09B 5/125* (2013.01); *H04B 7/26* (2013.01); *G06Q 50/30* (2013.01); *H04W 4/02* (2013.01)

(56) References Cited

U.S. PATENT DOCUMENTS

| | | | |
|---|---|---|---|
| 2012/0242687 A1* | 9/2012 | Choi | B60K 35/00 345/629 |
| 2016/0097651 A1* | 4/2016 | Jung | B60K 37/06 701/428 |

FOREIGN PATENT DOCUMENTS

| | | |
|---|---|---|
| JP | 2004326190 A | 11/2004 |
| JP | 2007122317 A | 5/2007 |
| JP | 2008097362 A | 4/2008 |
| JP | 2008299032 A | 12/2008 |
| JP | 2014022894 A | 2/2014 |
| WO | 03049315 A1 | 6/2003 |
| WO | 2010016589 A1 | 2/2010 |

OTHER PUBLICATIONS

Written Opinion issued in Intl. Appln. No. PCT/JP2016/051891 dated Apr. 19, 2016.

English translation of Written Opinion issued in Intl. Appln. No. PCT/JP2016/051891 dated Apr. 19, 2016, cited in IDS filed on Jul. 19, 2017.

Extended European Search Report issued in European Appln. No. 16740300.5 dated Jun. 4, 2018.

Office Action issued in Japanese Appln. No. 2016-177360 dated Jul. 10, 2018. English machine translation provided.

* cited by examiner

INFORMATION PROVISION SYSTEM, INFORMATION PROVISION METHOD, AND MANAGEMENT DEVICE

CROSS REFERENCE TO RELATED APPLICATION(S)

This application is a continuation of International Patent Application No. PCT/JP2016/051891 filed on Jan. 22, 2016 which claims the priority of Japanese Patent Application No. 2015-11651 filed on Jan. 23, 2015, the contents of which are incorporated herein by reference in its entirety.

BACKGROUND OF THE INVENTION

1. Field of the Invention

The present invention relates to a technology for reproducing contents such as images and voices by mobile terminals.

2. Description of the Related Art

Various technologies for reproducing contents such as images and voices by mobile terminals have conventionally been proposed. For example, JP-A-2002-351905 as Patent Literature 1 discloses a technology to distribute, to mobile terminals registered in advance as targets of distribution, contents appropriate to the positions of the mobile terminals.

Patent Literature 1: JP-A-2002-351905

SUMMARY OF THE INVENTION

For example, at transportation sites such as trains and buses, guidance voices to provide users with information related to getting on and off, transfer and the like are reproduced whenever necessary. If contents such as character strings and translated sentences of vocal contents of guidance voices can be provided to users' mobile terminals every guidance voice emission, it is convenient because even users such as hard-of-hearing persons for whom it is difficult to hear guidance voices and foreigners for whom it is difficult to understand the language of the guidance voices can grasp the contents of the guidance voices. However, under the technology of JP-A-2002-351905, provision of contents responsive to actual guidance voice emissions is not assumed.

In view of the above circumstances, a non-limited object of the present invention is to reproduce a content associated with a guidance voice by a mobile terminal along with the emission of the guidance voice.

There is provided an information provision system including: provision instruction means for generating a provision instruction to provide a content associated with a guidance voice every emission of the guidance voice; and information distribution means for transmitting distribution information for reproducing the content related to the provision instruction, to a mobile terminal registered as a target of provision of the content associated with the guidance voice.

DETAILED DESCRIPTION OF THE EXEMPLARY EMBODIMENTS

<First Embodiment>

Figure 1:
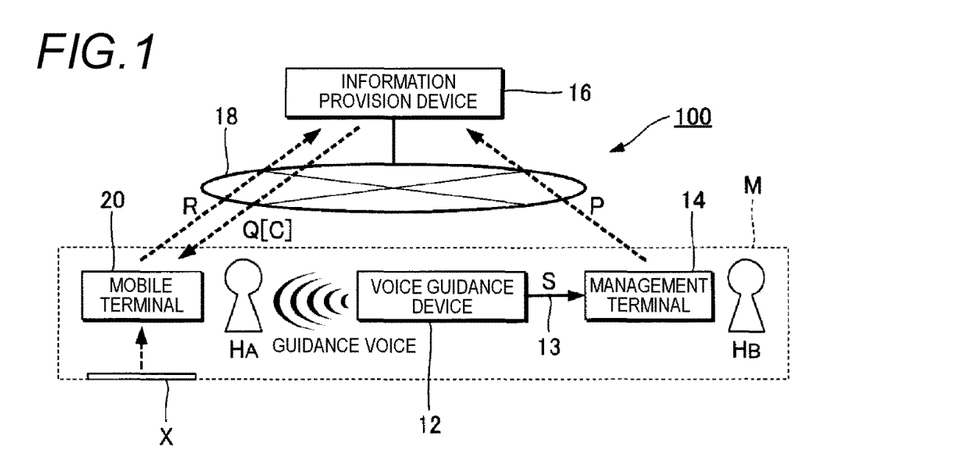
FIG. 1 is a configuration diagram of an information provision system according to a first embodiment of the present invention.

FIG. 1 is a configuration diagram of an information provision system 100 according to a first embodiment. The information provision system 100 of the first embodiment is a computer system that provides information to users HA of transportation sites such as trains and buses, and includes a voice guidance device 12, a management terminal 14 and an information provision device 16. Each user HA situated in a carriage M of the transportation site carries a mobile terminal 20. The mobile terminal 20 is a portable communication terminal such as a mobile telephone or a smartphone. While more than one mobile terminal 20 can exist in the carriage M in actuality, the following description will focus on one given mobile terminal 20 for the sake of convenience.

The voice guidance device 12 and the management terminal 14 are placed in the carriage M, and the information provision device 16 is connected to a communication network 18 including a mobile communication network, the Internet and the like. The mobile terminal 20 and the management terminal 14 are capable of communicating with the information provision device 16 through the communication network 18. The voice guidance device 12 emits voices for guidance (hereinafter, referred to as "guidance voices") related to the transportation site, to the user HA in the carriage M. The guidance voices are voices providing guidance, for example, on getting on and off of the transportation site (the names of stop points such as train stations and bus stops), transfer, fares, operation situations (for example, the presence or absence of a delay) and surrounding tourist attractions.

In the information provision system 100 of the first embodiment, briefly, as shown by example in FIG. 1, every emission of a guidance voice by the voice guidance device 12, a provision instruction P to provide a content C associated with the guidance voice is transmitted from the management terminal 14 to the information provision device 16, and distribution information Q containing the content C specified by the provision instruction P is transmitted from the information provision device 16 to the mobile terminal 20. The content C distributed from the information provision device 16 to the mobile terminal 20 is a voice or an image associated with the guidance voice (for example, a still image, a moving image, or a character string). For example, information of various kinds such as a character string expressing the vocal contents of the guidance voice and a character string or a voice which is a translation of the language of the vocal contents into another language is provided to the mobile terminal 20 as the content C. In the first embodiment, provision of guidance related to a plurality of guidance targets is assumed. The guidance target means the object of the guidance, and typically, a place where guidance is provided. While FIG. 1 shows by example the carriage M of the transportation site as the guidance target, in actuality, the voice guidance device 12 and the management terminal 14 are placed for each of a plurality of guidance targets (for example, for each carriage M of transportation site of the same kind). On the other hand, the information provision device 16 is shared by a plurality of guidance targets.

<Voice Guidance Device 12>

Figure 2:
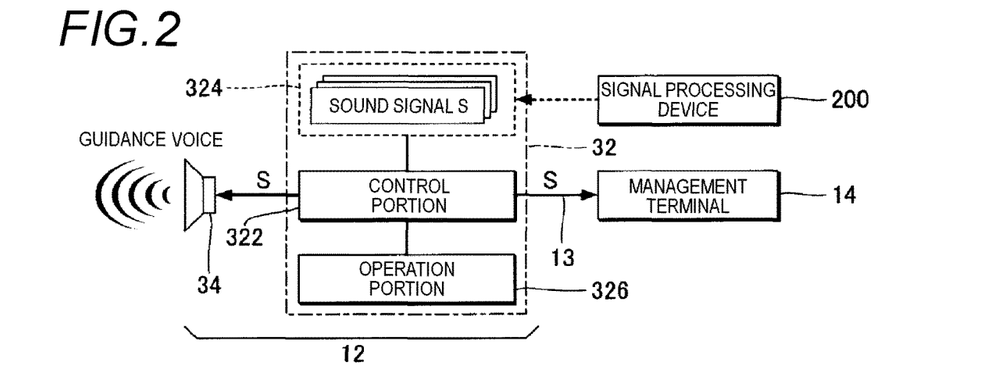
FIG. 2 is a configuration diagram of a voice guidance device.

FIG. 2 is a configuration diagram of the voice guidance device 12. As shown by example in FIG. 2, the voice guidance device 12 includes a reproduction processing portion 32 and a voice emission portion 34. The reproduction processing portion 32 supplies the voice emission portion 34 with a sound signal S representative of the guidance voice, and the voice emission portion 34 (for example, a speaker) emits into the carriage M the guidance voice corresponding to the sound signal S supplied from the reproduction processing portion 32.

As shown by example in FIG. 2, the reproduction processing portion 32 includes a control portion 322, a storage portion 324 and an operation portion 326. The storage portion 324 is a known recording medium such as a magnetic recording medium or a semiconductor recording medium, and stores a plurality of sound signals S corresponding to guidance voices having different vocal contents. For example, for each of a plurality of points where the carriage M stops (stop points such as train stations and bus stops), the sound signal S of the guidance voice providing guidance on the arrival at the point, the transfer at the point and surroundings of the point is stored in the storage portion 324. The operation portion 326 is an input device that accepts operations by an administrator (typically, the driver of the carriage M) HB of the transportation site. For example, by appropriately operating the operation portion 326, the administrator HB can select one given guidance voice from among the plurality of guidance voices stored in the storage portion 324.

The control portion 322 is formed of a processing unit such as a CPU, and integratedly controls the elements of the voice guidance device 12. The control portion 322 of the first embodiment supplies the voice emission portion 34 with, of the plurality of sound signals S stored in the storage portion 324, the sound signal S of the guidance voice selected by the administrator HB by an operation on the operation portion 326. Therefore, a guidance voice is emitted from the voice emission portion 34 every instruction from the administrator HB. The user HA in the carriage M can hear the guidance voice emitted from the voice emission portion 34.

Figure 3:
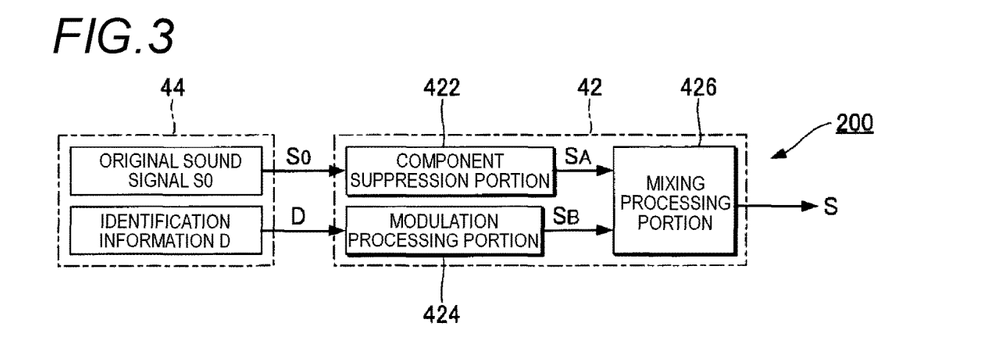
FIG. 3 is a configuration diagram of a signal processing device.

The sound signal S of the one given guidance voice contains identification information D for uniquely identifying the content C associated with the guidance voice. FIG. 3 is a configuration diagram of a signal processing device 200 that generates the sound signal S containing the identification information D. The plurality of sound signals S successively generated by the signal processing device 200 of FIG. 3 are transferred to the voice guidance device 12, for example, through the communication network 18 or a portable recording medium, and then, stored in the storage portion 324.

<Signal Processing Device 200>

As shown by example in FIG. 3, the signal processing device 200 includes a control portion 42 and a storage portion 44. The control portion 42 of the signal processing device 200 is formed of a processing unit such as a CPU, and functions as a plurality of elements for generating the sound signal S (a component suppression portion 422, a modulation processing portion 424, a mixing processing portion 426). The storage portion 44 is a known recording medium such as a magnetic recording medium or a semiconductor recording medium. The storage portion 44 of the first embodiment stores a sound signal representative of one given guidance voice (hereinafter, referred to as "original sound signal") S0 and the identification information D specific to the content C associated with the guidance voice. The guidance voice represented by the original sound signal S0 is, for example, a recording of a voice actually uttered by a specific speaker or a voice generated by a known voice synthesis technology.

Figure 4:
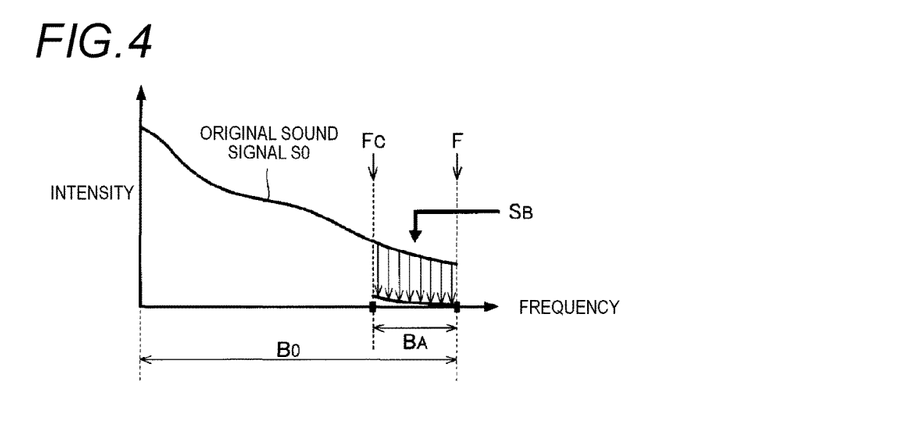
FIG. 4 is an explanatory view of the operation of the signal processing device.

FIG. 4 is an explanatory view of the operation of the signal processing device 200. As shown by example in FIG. 4, the original sound signal S0 contains sound components of substantially the entirety of the frequency band (hereinafter, referred to as "reproduction band") B0 of the sound that can be reproduced by the voice emission portion 34. The first embodiment assumes a low-performance voice emission portion 34 incapable of reproducing the sound components of the high frequency side of the frequency band in the audible band of appropriately from 20 Hz to 20 kHz. Specifically, a case where the upper limit F of the reproduction band B0 of the voice emission portion 34 is 8 kHz will be shown by example. As shown by example in FIG. 4, the component suppression portion 422 of FIG. 3 generates a sound signal SA by suppressing, of the original sound signal S0 stored in the storage portion 44, the sound components of a frequency band (hereinafter, referred to as "available band") BA of from the upper limit F of the band B0 of reproduction by the voice emission portion 34 over a predetermined width on the low-frequency side. For example, a low-pass filter having as the cutoff frequency a frequency FC lower than the upper limit F by the bandwidth of the available band BA is used as the component suppression portion 422. The bandwidth of the available band BA is, for example, 2 kHz. Therefore, the available band BA is a frequency band of not less than 6 kHz and not more than 8 kHz included in the audible band.

The modulation processing portion 424 of FIG. 3 generates a sound signal SB containing the identification information D stored in the storage portion 44. The sound signal SB is formed of the sound components in the available band BA. While a known method can be arbitrarily adopted for the generation of the sound signal SB containing the identification information D, for example, the method disclosed in WO 2010/016589 is suitable. Specifically, the modulation processing portion 424 successively executes spread modulation of the identification information D using a spread code and frequency modulation using a carrier wave in the available band BA, thereby generating the sound signal SB containing the identification information D as the sound components in the available band BA. The modulation processing portion 424 of the first embodiment adjusts the sound signal SB to a sufficiently low sound volume compared with the sound signal SA. Specifically, the sound volume (sound pressure level) of the sound signal SB is adjusted to a sound volume of approximately −50 dB to −80 dB with respect to the sound volume of the sound signal SA.

The mixing processing portion 426 of FIG. 3 synthesizes (typically, adds) the sound signal SA having undergone the processing by the component suppression portion 422 and the sound signal SB having undergone the processing by the modulation processing portion 424, thereby generating the sound signal S. That is, the sound signal S of one given guidance voice contains the sound component of the guidance voice (the sound signal SA) and the sound component of the identification information D of the content C associated with the guidance voice (the sound signal SB of the available band BA). The processings shown above by example are successively executed for each guidance voice, whereby a plurality of sound signals S corresponding to guidance voices different from each other are generated and transferred to the storage portion 324 of the voice guidance device 12. As is understood from the above description, the sound signal S emitted from the voice emission portion 34 of the voice guidance device 12 in the first embodiment contains the identification information D as the sound component (the sound signal SB) of the available band BA in the audible band. Since the sound signal SB is sufficiently low in sound volume compared with the sound signal SA of the guidance voice as described previously, the user HA in the carriage M clearly perceives the guidance voice but can hardly perceive the sound component of the identification information D in the available band BA.

As shown by example in FIG. 1, the management terminal 14 is connected to the reproduction processing portion 32 (an example of the reproduction processing means) of the guidance voice system through a signal line (cable) 13. By being triggered by an operation (selection of a guidance voice) from the administrator HB on the operation portion 326, the control portion 322 of the reproduction processing portion 32 supplies the voice emission portion 34 with the sound signal S stored in the storage portion 324 as described above to cause it to emit the guidance voice, and transmits the sound signal S from the signal line 13 to the management terminal 14. That is, the sound signal S is parallelly supplied to both the voice emission portion 34 and the management terminal 14. Therefore, every emission of a guidance voice by the voice emission portion 34, the sound signal S containing the identification information D of the content C associated with the guidance voice is transmitted to the management terminal 14 by cable.

The trigger of the supply of the sound signal S to the voice emission portion 34 and the management terminal 14 is not limited to the operation from the administrator HB on the operation portion 326. For example, the following structures may be adopted: a structure in which the sound signal S is supplied to the voice emission portion 34 and the management terminal 14 by being triggered by the arrival of a preset time (for example, an estimated time of arrival of the carriage M at a specific point); and a structure in which the sound signal S is supplied to the voice emission portion 34 and the management terminal 14 by being triggered by the detection of arrival of the carriage M at a specific point by a detector (sensor) placed in the carriage M.

<Management Terminal 14>

Figure 5:
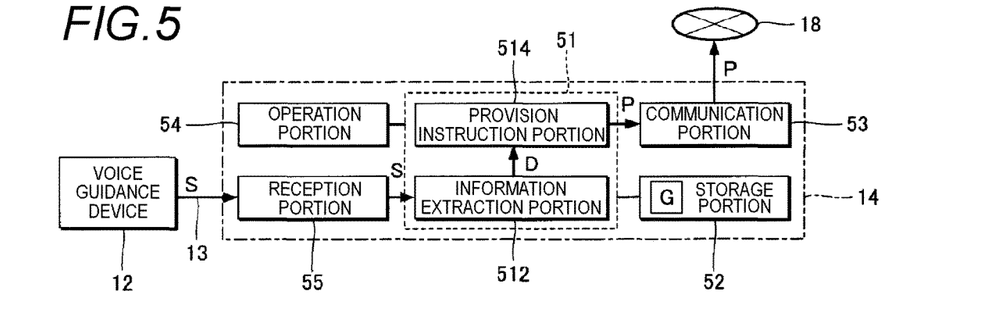
FIG. 5 is a configuration diagram of a management terminal.

FIG. 5 is a configuration diagram of the management terminal 14. The management terminal 14 is a portable or stationary communication terminal such as a mobile telephone or a smartphone used by the administrator HB, and as shown by example in FIG. 5, includes a control portion 51, a storage portion 52, a communication portion 53, an operation portion 54 an a reception portion 55. The communication portion 53 communicates with the information provision device 16 through the communication network 18.

The operation portion 54 is an input device that accepts operations by the administrator HB.

The storage portion 52 is a known recording medium such as a magnetic recording medium or a semiconductor recording medium, and stores programs executed by the control portion 51 and various pieces of data used by the control portion 51. The storage portion 52 of the first embodiment stores identification information (hereinafter, referred to as "guidance identification information") G for uniquely identifying the guidance target of the guidance using the management terminal 14. The reception portion 55 receives the sound signal S supplied by cable from the reproduction processing portion 32 of the voice guidance device 12 through the signal line 13.

The control portion 51 is formed of a processing unit such as a CPU, and functions as an information extraction portion 512 (an example of the information extraction means) and a provision instruction portion 514 (an example of the provision instruction means) by executing the programs stored in the storage portion 52. The information extraction portion 512 extracts the identification information D from the sound signal S received by the reception portion 55. Specifically, the information extraction portion 512 extracts, of the sound signal S, the sound components of the available band BA containing the identification information D, for example, with a high-pass filter, and causes it to pass through a matched filter by using as the coefficient the spread code used for the spread modulation of the identification information D, thereby extracting the identification information D.

The provision instruction portion 514 generates the provision instruction P to provide the content C specified by the identification information D extracted by the information extraction portion 512. Specifically, the provision instruction portion 514 generates the provision instruction P containing the identification information D extracted from the sound signal S by the information extraction portion 512 and the guidance identification information G stored in the storage portion 52, and transmits it from the communication portion 53 to the information provision device 16. The extraction of the identification information D by the information extraction portion 512 and the generation of the provision instruction P by the provision instruction portion 514 are executed every time the sound signal S is received from the reproduction processing portion 32 of the voice guidance device 12. As described previously, the reproduction processing portion 32 parallelly supplies the sound signal S to the voice emission portion 34 and the management terminal 14. Therefore, every emission of a guidance voice by the voice emission portion 34, the extraction of the identification information D of the content C associated with the guidance voice and the generation of the provision instruction P to provide the content C specified by the identification information D are executed.

<Mobile Terminal 20>

Figure 6:
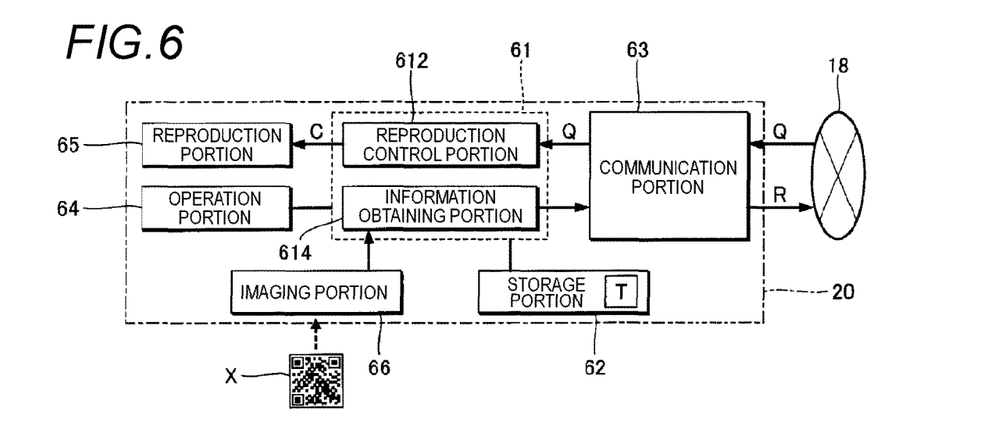
FIG. 6 is a configuration diagram of a mobile terminal.

FIG. 6 is a configuration diagram of one given mobile terminal 20. As shown by example in FIG. 6, the mobile terminal 20 includes a control portion 61, a storage portion 62, a communication portion 63, an operation portion 64, a reproduction portion 65 and an imaging portion 66. The storage portion 62 is a known recording medium such as a magnetic recording medium or a semiconductor recording medium, and stores programs executed by the control portion 61 and various pieces of data used by the control portion 61. For example, identification information (hereinafter, referred to as "terminal identification information") T for uniquely identifying the mobile terminal 20 is stored in the storage portion 62. The operation portion 64 is an input device that accepts operations by the user HA.

The communication portion 63 communicates with the information provision device 16 through the communication network 18. For example, the communication portion 63 receives the distribution information Q containing the content C associated with the guidance voice from the information provision device 16. The reproduction portion 65 reproduces the content C provided from the information provision device 16. Specifically, a display device (for example, a liquid crystal display panel) that displays the image of the content C and a voice emission device (for example, a speaker or a headphone) that emits the sound of the content C are used as the reproduction portion 65.

The control portion 61 is formed of a processing unit such as a CPU, and functions as a reproduction control portion 612 and an information obtaining portion 614 by executing the programs stored in the storage portion 62. The reproduction control portion 612 causes the reproduction portion 65 to reproduce the content C contained in the distribution information Q received from the information provision device 16. On the other hand, the information obtaining portion 614 obtains the guidance identification information G provided at the place where the guidance voice is emitted (that is, in the carriage M).

In the first embodiment, an information image X is placed in the carriage M which is the guidance target. For example, the information image X is printed onto a printed matter such as an advertising poster posted in the carriage M. The information image X is an optically readable two-dimensional image (for example, a QR code [trademark]) representative of the guidance identification information G specific to the guidance target. The imaging portion 66 of FIG. 6 is formed so as to include, for example, an imaging element capable of taking images, and takes the information image X by being triggered by an instruction from the user HA on the operation portion 64. The information obtaining portion 614 identifies the guidance identification information G by the demodulation of the information image X taken by the imaging portion 66, and transmits a registration request R containing the guidance identification information G and the terminal identification information T of the mobile terminal 20 from the communication portion 63 to the information provision device 16. The registration request R is a signal requesting for registration (so to speak, check-in) of the mobile terminal 20 as the target of provision of the content C associated with the guidance voice of the guidance target specified by the guidance identification information G. Since the guidance identification information G of one given guidance target is provided in a limited way at the place where the guidance voice of the guidance target is emitted, the mobile terminal 20 having transmitted the registration request R containing the guidance identification information G of a specific guidance target is estimated to be situated at the place where the guidance voice of the guidance target is emitted (for example, in the carriage M).

<Information Provision Device 16>

Figure 7:
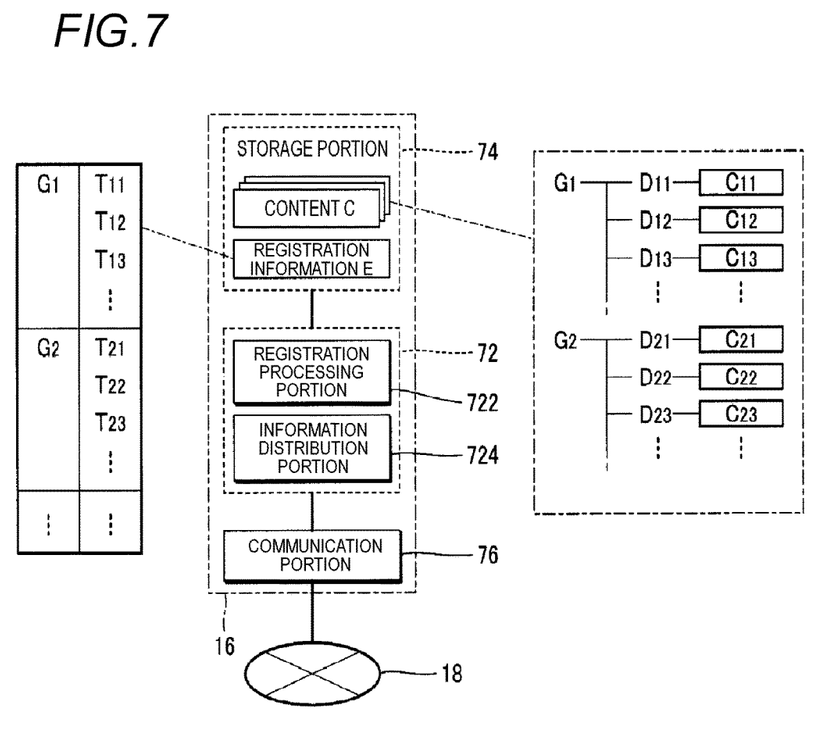
FIG. 7 is a configuration diagram of the information provision device.

FIG. 7 is a configuration diagram of the information provision device 16. The information provision device 16 is, for example, a server device (typically, a web server) connected to the communication network 18, and as shown by example in FIG. 7, includes a control portion 72, a storage portion 74 and a communication portion 76. The communication portion 76 communicates with each of the mobile terminal 20 and the management terminal 14 through the communication network 18. The communication portion 76 of the first embodiment receives, through the communication network 18, the provision instruction P transmitted by the management terminal 14 and the registration request R transmitted by the mobile terminal 20. The storage portion 74 is a known recording medium such as a magnetic recording medium or a semiconductor recording medium, and stores a plurality of contents C and registration information E. As shown by example in FIG. 7, to each of the plurality of contents C (C11, C12, . . . ), the identification information D (D11, D12, . . . ) specific to the content C and the guidance identification information G (G1, G2, . . . ) specific to the guidance target (the carriage M) where the guidance voice corresponding to the content C is emitted are added.

The registration information E specifies the mobile terminal 20 that is the target of provision of the content C associated with the guidance voice of each guidance target. Specifically, as shown by example in FIG. 7, the registration information E is a data table in which the guidance identification information G (G1, G2, . . . ) specific to each guidance target and the terminal identification information T (T11, T12, . . . ) of more than one mobile terminal 20 which is the target of provision of the content C associated with the guidance voice of the guidance target are associated.

The control portion 72 is formed of a processing unit such as a CPU, and functions as a registration processing portion 722 (an example of the registration processing means) and an information distribution portion 724 (an example of the information distribution means) by executing the programs stored in the storage portion 74. The registration processing portion 722 updates the registration information E in response to the registration request R transmitted from the mobile terminal 20. Specifically, the registration processing portion 722 associates the terminal identification information T specified by the registration request R with, of a plurality of pieces of guidance identification information G contained in the registration information E, the guidance identification information G specified by the registration request R. That is, the mobile terminal 20 of the terminal identification information T specified by the registration request R is registered as the target of distribution of the content C of the guidance target specified by the guidance identification information G in the registration request R.

The information distribution portion 724 generates the distribution information Q and transmits it from the communication portion 76 to the mobile terminal 20. Specifically, the information distribution portion 724 transmits the content C of the identification information D specified by the provision instruction P received from the management terminal 14, to each mobile terminal 20 registered in the registration information E with respect to the guidance identification information G specified by the provision instruction P (that is, each target of distribution of the content C registered with respect to the guidance target). As described previously, the mobile terminal 20 having transmitted the registration request R containing the guidance identification information G of a specific guidance target is estimated to be situated at a place where the guidance voice of the guidance target is emitted. Therefore, the content C corresponding to the guidance voice of the guidance target is provided to the mobile terminal 20 situated at a place where the guidance voice of the guidance target is emitted.

<General Operation>

Figure 8:
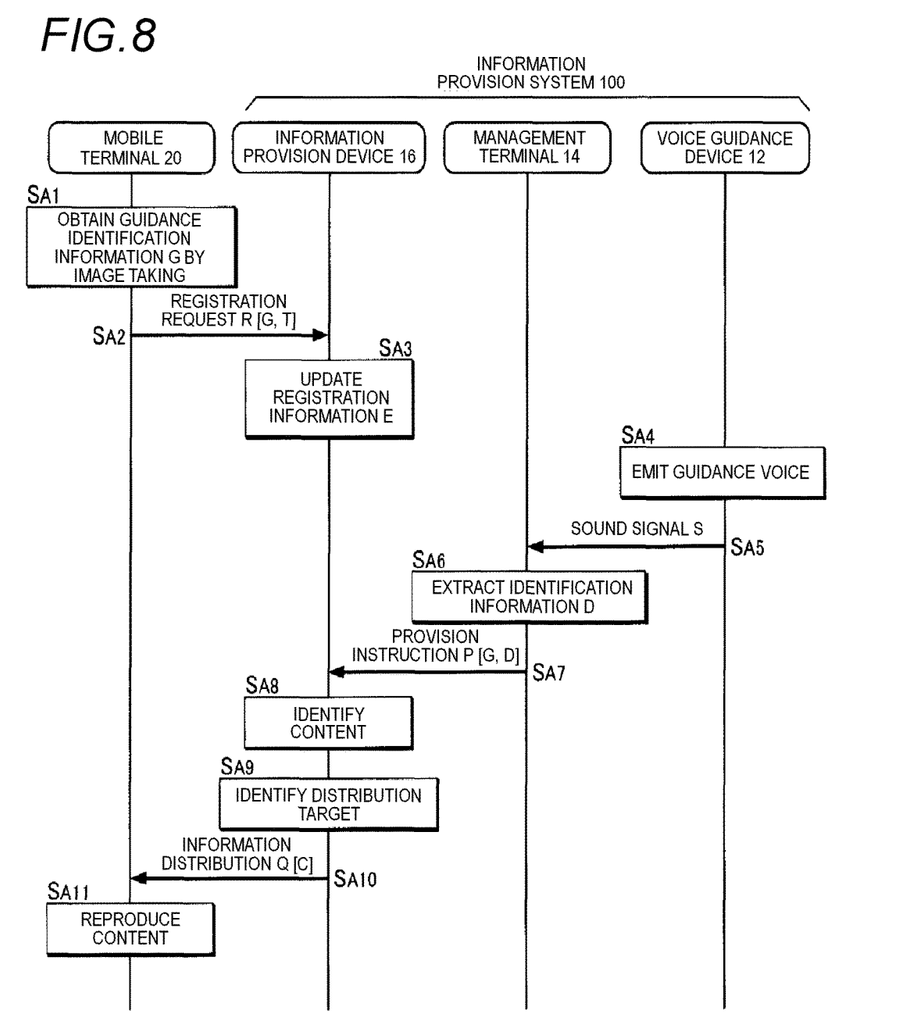
FIG. 8 is an explanatory view of the operation of the information provision system.

FIG. 8 is an explanatory view of the general operation of the information provision system 100. The user HA getting on the carriage M appropriately operates the operation portion 64 of his/her own mobile terminal 20, thereby providing an instruction to take an image of the information image X placed in the carriage M. When the imaging portion 66 takes the information image X in response to an instruction from the user HA (SA1), the information obtaining portion 614 of the mobile terminal 20 transmits the registration request R containing the guidance identification information G identified from the information image X and the terminal identification information T of the mobile terminal 20 from the communication portion 63 to the information provision device 16 (SA2).

When the communication portion 76 receives the registration request R transmitted by the mobile terminal 20, the registration processing portion 722 of the information provision device 16 registers the terminal identification information T specified by the registration request R, with respect to the guidance identification information G, specified by the registration request R, of the registration information E (SA3). That is, the mobile terminal 20 in the carriage M is added as the target of distribution of the content C associated with the guidance voice emitted in the carriage M which is the guidance target.

On the other hand, the reproduction processing portion 32 of the voice guidance device 12 supplies the voice emission portion 34 with the sound signal S of the guidance voice selected by the administrator HB by an operation on the operation portion 326 (SA4), and transmits it to the management terminal 14 through the signal line 13 (SA5). By the supply of the sound signal S, the guidance voice is emitted from the voice emission portion 34, and the user HA situated in the carriage M hears the guidance voice. On the other hand, the information extraction portion 512 of the management terminal 14 analyzes the sound signal S supplied from the reproduction processing portion 32, thereby extracting the identification information D of the content C associated with the guidance voice (SA6). The provision instruction portion 514 transmits the provision instruction P containing the identification information D extracted by the information extraction portion 512 and the guidance identification information G held by the storage portion 52 from the communication portion 53 to the information provision device 16 (SA7).

When the communication portion 76 receives the provision instruction P transmitted from the management terminal 14, the information distribution portion 724 of the information provision device 16 identifies the content C corresponding to the identification information D, specified by the provision instruction P, of a plurality of contents C stored in the storage portion 74 (SA8), and identifies from the registration information E more than one piece of terminal identification information T corresponding to the guidance identification information G specified by the provision instruction P (that is, the mobile terminal 20 registered as the target of distribution of the content C of the guidance target) (SA9). Then, the information distribution portion 724 transmits from the communication portion 76 the distribution information Q containing the content C identified at step SA8 with the mobile terminal 20 of each piece of terminal identification information T identified at step SA9 as the destination (SA10).

When the communication portion 63 receives the distribution information Q transmitted from the information provision device 16, the reproduction control portion 612 of the mobile terminal 20 causes the reproduction portion 65 to reproduce the content C contained in the distribution information Q (SA11). As is understood from the above description, in the carriage M which is the guidance target, the guidance voices related to the guidance target are successively emitted from the voice emission portion 34 in the carriage M, whereas every emission of the guidance voices, the contents C associated with the guidance voices are successively reproduced by the reproduction portion 65 of the mobile terminal 20. That is, the contents C associated with the guidance voices are successively reproduced at the mobile terminal 20 along with the emission of the guidance voices. Therefore, the user HA in the carriage M successively hears the guidance voices, and can successively view the contents C associated with the guidance voices.

The registration processing portion 722 of the information provision device 16 deletes the terminal identification information T from the registration information E on condition that a predetermined time (a time during which the user HA is expected to be situated in the carriage M) has elapsed since the terminal identification information T is added to the registration information E. That is, the mobile terminal 20 of the terminal identification information T is excluded from the target of distribution of the distribution information Q. Consequently, the distribution information Q is not transmitted to the mobile terminal 20 of the user HA having gotten off the carriage M. The condition for deleting the terminal identification information T from the registration information E is not limited to the one shown above (the elapse of the predetermined time). For example, the terminal identification information T of the mobile terminal 20 may be deleted from the registration information E by being triggered by a deletion request transmitted from the mobile terminal 20 to the information provision device 16 in response to an operation from the user HA on the operation portion 64.

As described above, in the first embodiment, the provision instruction P to provide the content C associated with the guidance voice is generated every guidance voice emission by the voice emission portion 34, and the distribution information Q of the content C related to the provision instruction P is transmitted to the mobile terminal 20 registered as the target of distribution in the registration information E. Therefore, the content C associated with each guidance voice of the guidance target can be reproduced at the mobile terminal 20 along with the emission of the guidance voice.

Moreover, in the first embodiment, when the information provision device 16 receives from the mobile terminal 20 the registration request R containing the guidance identification information G that can be obtained at a place (in the carriage M) where the guidance voice is emitted, the mobile terminal 20 is registered as the target of provision of the content C associated with the guidance voice. Therefore, the target of provision of the content C associated with the guidance voice can be limited to the mobile terminal 20 situated at the place where the guidance voice is emitted. Particularly in the first embodiment, since the registration request R containing the guidance identification information G obtained by the mobile terminal 20 by taking the information image X placed at the place where the guidance voice is emitted is transmitted from the mobile terminal 20, an advantage is obtained in that the structure and procedures for causing the mobile terminal 20 to obtain the guidance identification information G are simplified.

Moreover, in the first embodiment, the guidance voice is emitted from the voice emission portion 34 by the supply of the sound signal S, whereas the identification information D contained in the sound signal S as the sound component is extracted at the management terminal 14 and then, the provision instruction P is generated. That is, the sound signal S is shared by the guidance voice emission by the voice emission portion 34 and the extraction of the identification information D by the management terminal 14. Therefore, the guidance voice emission by the voice emission portion 34 and the transmission of the provision instruction P by the provision instruction portion 514 (consequently, the provision of the content C to the mobile terminal 20) can be easily linked together.

The sound volume in the available band BA containing the sound component of the identification information D is suppressed to a sufficiently low sound volume compared with the sound component (the sound signal SA) of the remaining frequency band. Therefore, an advantage is obtained in that the identification information D can be highly accurately extracted from the sound signal S even when the sound volume of the sound component of the identification information D is sufficiently suppressed so that the sound component of the identification information D is difficult to be perceived by the user HA having heard the sound emitted from the voice emission portion 34.

As a structure for extracting the identification information D contained in the sound signal S at the management terminal 14, for example, a structure can be considered in which the identification information D is extracted from a sound signal obtained by recording the sound emitted from the voice emission portion 34 at the management terminal 14 (hereinafter, also referred to as "comparative example"). However, in the comparative example, since noise is superimposed on the sound on the path from the voice emission portion 34 to the management terminal 14, it can be difficult to highly accurately extract the identification information D at the management terminal 14 as a result. In the first embodiment, since the sound signal S containing the identification information D is transmitted from the voice guidance device 12 to the management terminal 14 by cable, the influence of noise on the sound signal S is reduced. Therefore, according to the first embodiment, an advantage is obtained in that the identification information D can be highly accurately extracted from the sound signal S compared with the comparative example. However, the description given above does not intend to exclude the comparative example from the scope of the present invention, and the comparative example is embraced by the scope of the present invention.

<Second Embodiment>

A second embodiment of the present invention will be described. In each embodiment shown below by example, for elements the workings and functions of which are similar to those of the first embodiment, the reference numerals and signs used in the description of the first embodiment are also used and detailed descriptions thereof are omitted as appropriate.

Figure 9:
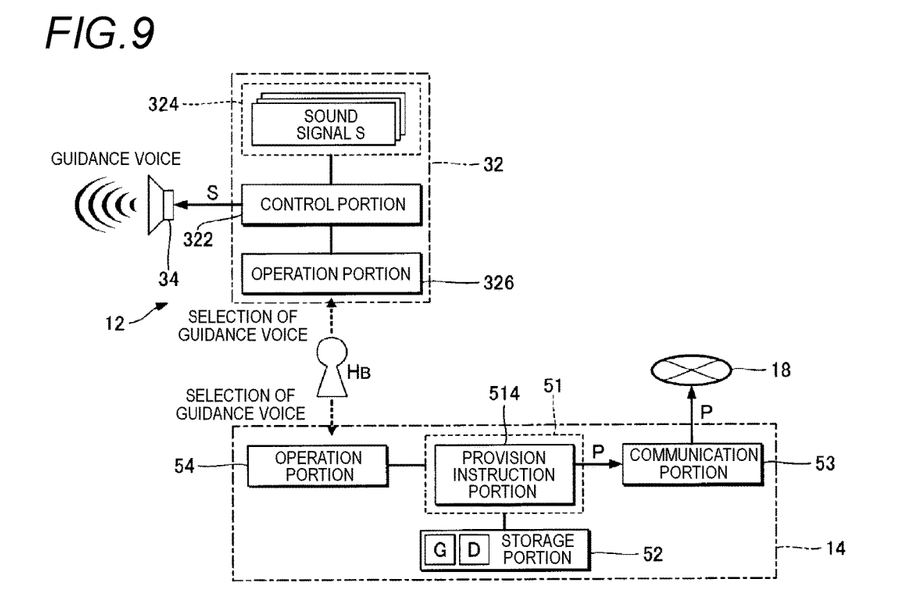
FIG. 9 is a configuration diagram of a voice guidance device and a management terminal in a second embodiment.

FIG. 9 is a configuration diagram of the voice guidance device 12 and the management terminal 14 in the second embodiment. As shown by example in FIG. 9, in the second embodiment, the voice guidance device 12 and the management terminal 14 are not connected. The reproduction processing portion 32 of the voice guidance device 12 supplies the voice emission portion 34 with the sound signal S of the guidance voice selected by the administrator HB by an operation on the operation portion 326.

The management terminal 14 of the second embodiment has a structure which is the structure of the first embodiment from which the reception portion 55 and the information extraction portion 512 are omitted. Moreover, in the storage portion 52 of the second embodiment, for each of a plurality of guidance voices (that is, a plurality of guidance voices that can be emitted by the voice guidance device 12) the sound signals S of which are stored in the storage portion 324 of the voice guidance device 12, the identification information D of the content C associated with the guidance voice is stored.

The administrator HB selects a desired guidance voice by an operation on the operation portion 326 of the voice guidance device 12, and selects the guidance voice (or the content C associated with the guidance voice) by an operation on the operation portion 54 of the management terminal 14. The provision instruction portion 514 obtains from the storage portion 52 the identification information D of the content C associated with the guidance voice selected by the administrator HB by an operation on the operation portion 54, and transmits the provision instruction P containing the identification information D and the guidance identification information G of the guidance target from the communication portion 53 to the information provision device 16. Other structures and operations in the second embodiment are similar to those of the first embodiment.

As is understood from the above description, in the second embodiment, the operation of the voice emission portion 34 emitting the guidance voice and the operation of generating and transmitting the provision instruction P to provide the content C of the guidance voice are executed along with each other. That is, the provision instruction P to provide the content C associated with the guidance voice is successively generated every guidance voice emission by the voice emission portion 34. Therefore, as in the first embodiment, the content C associated with each guidance voice of the guidance target can be reproduced at the mobile terminal 20 along with the emission of the guidance voice. Moreover, since communication (transmission and reception of the sound signal S) between the voice guidance device 12 and the management terminal 14 is unnecessary in the second embodiment, the second embodiment is effective, for example, when the voice guidance device 12 and the management terminal 14 cannot be connected together (for example, when these cannot be connected because of hardware limitations.

<Third Embodiment>

Figure 10:
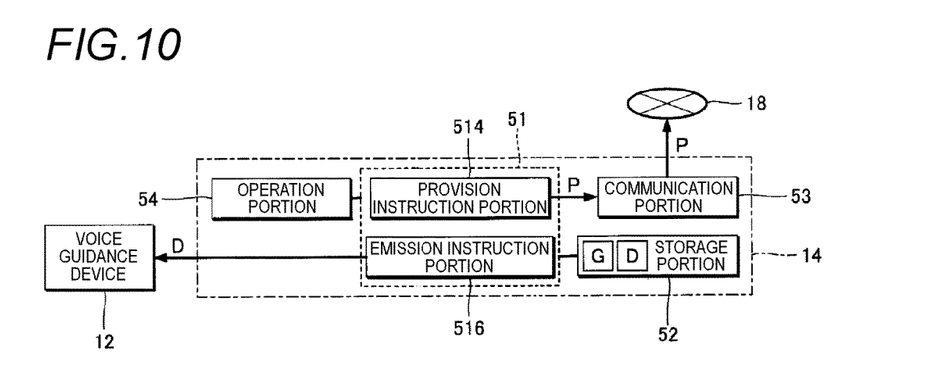
FIG. 10 is a configuration diagram of a management terminal in a third embodiment.

FIG. 10 is a configuration diagram of the management terminal 14 in a third embodiment. As shown by example in FIG. 10, the management terminal 14 of the third embodiment has a structure in which the reception portion 55 of the first embodiment is omitted and the information extraction portion 512 of the first embodiment is replaced by an emission instruction portion 516. Moreover, as in the second embodiment, the storage portion 52 of the management terminal 14 of the third embodiment stores the identification information D of the content C for each of a plurality of guidance voices that can be emitted by the voice guidance device 12.

The administrator HB selects a desired guidance voice (or the content C associated with the guidance voice) by an operation on the operation portion 54 of the management terminal 14. The provision instruction portion 514, as in the second embodiment, obtains from the storage portion 52 the identification information D of the content C associated with the guidance voice selected by the administrator HB by the operation on the operation portion 54, and transmits the provision instruction P containing the identification information D and the guidance identification information G of the guidance target from the communication portion 53 to the information provision device 16.

On the other hand, the emission instruction portion 516 notifies the voice guidance device 12 of the guidance voice selected by the administrator HB by the operation on the operation portion 54. It does not matter whether the communication between the management terminal 14 and the voice guidance device 12 is by cable or by radio. The control portion 322 of the voice guidance device 12 supplies the sound signal S of the guidance voice specified by the management terminal 14 from the storage portion 324 to the voice emission portion 34, thereby causing the guidance voice to be emitted. Other structures and operations in the third embodiment are similar to those of the first embodiment.

As is understood from the above description, in the third embodiment, the operation of the management terminal 14 transmitting the provision instruction P to provide the content C of the guidance voice selected by the administrator HB and the operation of the voice emission portion 34 emitting the guidance voice are executed along with each other. That is, the provision instruction P to provide the content C associated with the guidance voice is successively generated every guidance voice emission by the voice emission portion 34. Therefore, as in the first embodiment, the content C associated with each guidance voice of the guidance target can be reproduced at the mobile terminal 20 along with the emission of the guidance voice. The third embodiment is particularly suitable for a case where the administrator HB such as a bus tour guide or a tour guide carries a portable voice guidance device 12 and management terminal 14 (or a device where the voice guidance device 12 and the management terminal 14 are integrally formed) when guiding the users HA in the carriage M.

<Fourth Embodiment>

Figure 11:
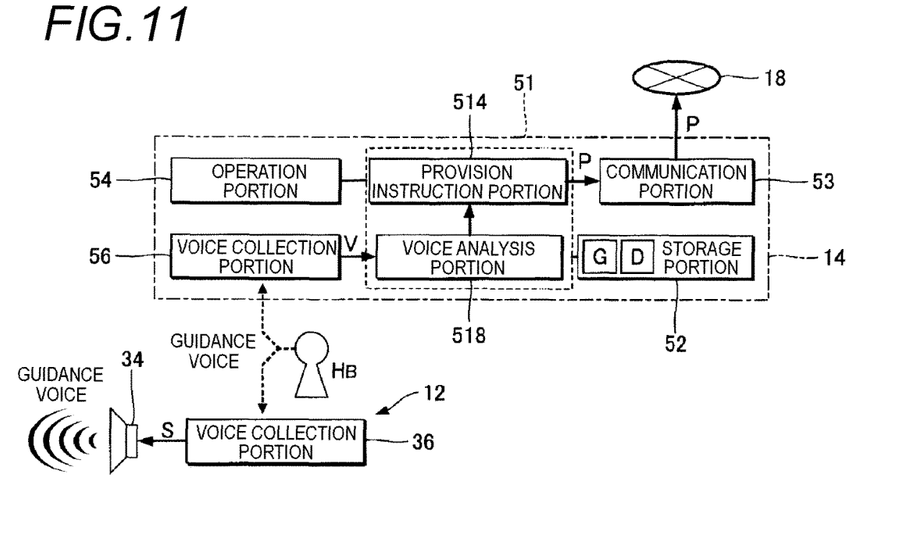
FIG. 11 is a configuration diagram of a voice guidance device and a management terminal in a fourth embodiment.

FIG. 11 is a configuration diagram of the voice guidance device 12 and the management terminal 14 in a fourth embodiment. As shown by example in FIG. 11, the voice guidance device 12 of the fourth embodiment has a structure in which the reproduction processing portion 32 of the voice guidance device 12 of the first embodiment is replaced by a voice collection portion 36. The voice collection portion 36 (microphone) generates the sound signal S by collecting the guidance voice uttered by the administrator HB, amplifies it, and supplies it to the voice emission portion 34. Therefore, the guidance voice uttered by the administrator HB is emitted form the voice emission portion 34.

On the other hand, as shown by example in FIG. 11, the management terminal 14 of the fourth embodiment has a structure in which the reception portion 55 of the first embodiment is replaced by a voice collection portion 56 (microphone) and the information extraction portion 512 is replaced by a voice analysis portion 518. The voice collection portion 56 collects the guidance voice uttered by the administrator HB and generates a voice signal V. As is understood from the above description, the guidance voice uttered by the administrator HB is parallelly collected by both the voice collection portion 36 of the voice guidance device 12 and the voice collection portion 56 of the management terminal 14.

The voice analysis portion 518 of FIG. 11 analyzes the vocal contents of the guidance voice by an analysis of the voice signal V. For the analysis of the vocal contents, a known voice recognition technology is arbitrarily adopted. Moreover, for each guidance voice to be uttered by the administrator HB, the storage portion 52 of the fourth embodiment stores the identification information D of the content C associated with the guidance voice. The provision instruction portion 514 retrieves from the storage portion 52 the identification information D corresponding the guidance voice of the vocal contents analyzed by the voice analysis portion 518, and transmits the provision instruction P containing the identification information D and the guidance identification information G of the guidance target from the communication portion 53 to the information provision device 16. Other structures and operations in the fourth embodiment are similar to those of the first embodiment.

As is understood from the above description, in the fourth embodiment, the operation of the voice emission portion 34 emitting the guidance voice uttered by the administrator HB and the operation of the management terminal 14 transmitting the provision instruction P to provide the content C associated with the guidance voice are executed along with each other. That is, the generation of the provision instruction P to provide the content C associated with the guidance voice is successively executed every guidance voice emission by the voice emission portion 34. Therefore, as in the first embodiment, the content C associated with each guidance voice of the guidance target can be reproduced at the mobile terminal 20 along with the emission of the guidance voice.

While the provision instruction portion 514 selects the identification information D according to the vocal contents identified by the analysis of the voice signal V in FIG. 11, the provision instruction portion 514 may select the identification information D corresponding to the guidance voice selected by the administrator HB by an operation on the operation portion 54 as in the third embodiment while the guidance voice uttered by the administrator HB is emitted from the voice emission portion 34 of the voice guidance device 12.

<Fifth Embodiment>

The information provision system 100 of a fifth embodiment has a structure similar to that of the fourth embodiment shown by example in FIG. 11. That is, as in the fourth embodiment, the voice guidance device 12 of the fifth embodiment includes the voice collection portion 36 that generates the sound signal S by collecting the guidance voice uttered by the administrator HB and the voice emission portion 34 that emits the guidance voice corresponding to the sound signal S.

The management terminal 14 of the fifth embodiment includes the voice collection portion 56 and the voice analysis portion 518 as in the fourth embodiment. The voice analysis portion 518 analyzes the vocal contents by voice recognition on the voice signal V generated by the voice collection portion 56, and generates the character string representative of the vocal contents as the content C. The provision instruction portion 514 transmits the provision instruction P containing the content C generated by the voice analysis portion 518 and the guidance identification information G of the guidance target from the communication portion 53 to the information provision device 16.

The information distribution portion 724 of the information provision device 16 transmits the content C in the provision instruction P to each mobile terminal 20 registered in the registration information E with respect to the guidance identification information G specified by the provision instruction P received from the management terminal 14 (that is, the target of distribution of the content C registered with respect to the guidance target). That is, the content C of the character string expressing the vocal contents of the guidance voice uttered by the administrator HB is provided to each mobile terminal 20 in the carriage M. A character string which is an edit (for example, correction by the administrator HB) or a translation of the character string of the vocal contents of the guidance voice may be provided to each mobile terminal 20 as the content C.

As is understood from the above description, in the fifth embodiment, the operation of the voice emission portion 34 emitting the guidance voice uttered by the administrator HB and the operation of the management terminal 14 transmitting the provision instruction P to provide the content C representative of the vocal contents of the guidance voice are executed along with each other. That is, the provision instruction P to provide the content C associated with the guidance voice is successively generated every guidance voice emission by the voice emission portion 34. Therefore, as in the first embodiment, the content C associated with each guidance voice of the guidance target can be reproduced at the mobile terminal 20 along with the emission of the guidance voice. The fifth embodiment also has an advantage in that it is unnecessary to prestore a plurality of contents C in the storage portion 74 of the information provision device 16. However, the contents C successively transmitted form the management terminal 14 and the contents C prestored in the storage portion 74 may be used concurrently.

<Sixth Embodiment>

Figure 12:
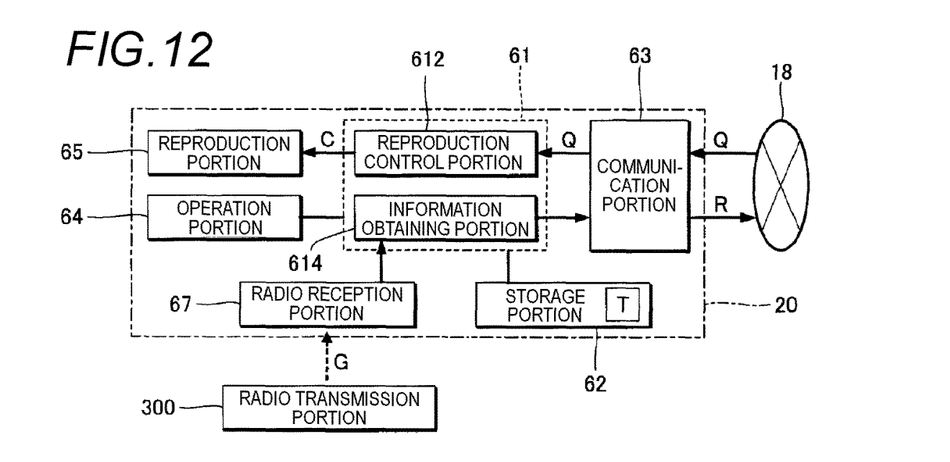
FIG. 12 is a configuration diagram of a mobile terminal in a sixth embodiment.

FIG. 12 is a configuration diagram of the mobile terminal 20 in a sixth embodiment. As is understood from FIG. 12, the mobile terminal 20 of the sixth embodiment has a structure in which the imaging portion 66 of the first embodiment is replaced by a radio reception portion 67.

In the sixth embodiment, a radio transmission portion 300 is placed in the carriage M. The radio transmission portion 300 is a communication device that periodically transmits the guidance identification information G of the guidance target (the carriage M) to the surroundings by near field communication. The radio reception portion 67 of the mobile terminal 20 situated in the carriage M receives the guidance identification information G transmitted from the radio transmission portion 300. While the specific communication method for the near field communication executed between the radio transmission portion 300 and the radio reception portion 67 is arbitrary, radio communication using electromagnetic waves such as radio waves or infrared rays as the transmission medium or sound communication using sounds which are air vibrations as the transmission medium may be suitably adopted.

The information obtaining portion 614 of the mobile terminal 20 in the sixth embodiment obtains the guidance identification information G received by the radio reception portion 67, and transmits the registration request R containing the guidance identification information G and the terminal identification information T of the mobile terminal 20 from the communication portion 63 to the information provision device 16. Other structures and operations in the sixth embodiment are similar to those of any of the first to fifth embodiments. In the sixth embodiment, advantages similar to those of the first embodiment are realized. The radio transmission portion 300 shown by example in FIG. 12 may be mounted on the management terminal 14.

<Modifications>

The embodiments shown above by example may be modified variously. Specific modification modes will be shown below by example. Two or more modes arbitrarily selected from among the exemplifications shown below may be appropriately merged as long as no contraction arises therebetween.

(1) While the above-described embodiments show by example the structure in which the distribution information Q transmitted from the information provision device 16 to the mobile terminal 20 contains the content C, the contents of the distribution information Q are not limited to the shown examples. For example, in a structure in which a plurality of contents C are prestored in the storage portion 62 of the mobile terminal 20, the distribution information Q containing the identification information D of the content C specified by the provision instruction P (not containing the content C itself) may be transmitted from the information provision device 16 to the mobile terminal 20. The reproduction control portion 612 of the mobile terminal 20 obtains from the storage portion 62 the content C corresponding to the identification information D contained in the distribution information Q and causes the reproduction portion 65 to reproduce it. As is understood from the above, the distribution information Q in the above-described embodiments is comprehensively expressed as information for reproducing the content C associated with the guidance voice at the mobile terminal 20, and whether the content C itself is contained in the distribution information Q or not does not matter.

(2) The condition for deleting (so to speak, check-out) the terminal identification information T from the registration information E is arbitrary. For example, like the example shown in FIG. 6, in a structure in which the mobile terminal 20 transmits the registration request R to the information provision device 16 by being triggered by the communication with the radio transmission portion 300 (reception of the guidance identification information G) like the example of the sixth embodiment, when the arrival of the radio signal from the radio transmission portion 300 at the mobile terminal 20 ceases (for example, when the reception intensity is decreased up to less than a threshold value), a delete request to request for the deletion of the terminal identification information T of the mobile terminal 20 from the registration information E may be transmitted from the mobile terminal 20 to the information provision device 16.

A structure is considered in which the function of estimating the state of communication with the radio transmission portion 300 is mounted on the mobile terminal 20. A typical example of the communication state is the distance from the radio transmission portion 300 estimated, for example, according to the reception intensity, and any state of, for example, immediate, near, far and unknown is determined. In this structure, the mobile terminal 20 may transmit the deletion request to the information provision device 16 when a predetermined time has elapsed since a communication possible state (immediate, near, far) is shifted to an unknown state where communication is impossible.

(3) While the voice guidance of transportation site such as trains and buses is shown by example in the above-described embodiments, the guidance target where the information provision system 100 is used is not limited to the above exemplifications. For example, the information provision system 100 similar to those of the above-described embodiments is also used for the voice guidance of a mobile unit (equipment that accommodates the mobile terminal 20 and moves) embracing ships or airplanes as well as the carriage M. The information provision system 100 may also be used for the voice guidance of various facilities such as exhibition facilities such as art museums and museums, accommodation facilities or commercial facilities. The information provision system 100 may also be used for information provision (for example, guidance of evacuation or notification of the situation) when a disaster such as a fire or an earthquake occurs at various facilities.

(4) While a structure in which the voice guidance device 12, the management terminal 14 and the information provision device 16 are separate devices is shown by example in the above-described embodiments, whether a plurality of devices are integral or separate and the relation between the functions and the devices are arbitrary. For example, the following structures may be adopted: a structure in which some functions of one of the management terminal 14 and the information provision device 16 are mounted on the other thereof; and a structure in which the functions of the information provision device 16 and the management terminal 14 are mounted on a single device. Moreover, the function of the voice guidance device 12 may be mounted on the management terminal 14 (the management terminal 14 is used also as the voice guidance device 12).

To solve the above-mentioned problem, an information provision system of the present invention includes: provision instruction means for generating a provision instruction to provide a content associated with a guidance voice every emission of the guidance voice; and information distribution means for transmitting distribution information for reproducing the content related to the provision instruction, to a mobile terminal registered as a target of provision of the content associated with the guidance voice.

In the above-described structure, the provision instruction to provide the content associated with the guidance voice is generated every emission of the guidance voice, and the distribution information for reproducing the content related to the provision instruction is transmitted to the mobile terminal registered as the target of provision. Therefore, the content associated with the guidance voice can be reproduced at the mobile terminal along with the emission of the guidance voice.

An information provision system according to another mode of the present invention further includes registration processing means for receiving, from the mobile terminal, guidance identification information obtained by the mobile terminal at a place where the guidance voice is emitted, and registering the mobile terminal as a target of provision of the content associated with the guidance voice of a guidance target specified by the guidance identification information.

In the above-described mode, since the mobile terminal having obtained the guidance identification information at the place where the guidance voice is emitted is registered as the target of provision of the content, an advantage is obtained in that the content can be provided only to the mobile terminal situated at the place where the guidance voice is emitted. For example, the following structures are suitable: a structure in which the registration processing means receives from the mobile terminal the guidance identification information obtained by the mobile terminal by taking an information image placed at the place where the guidance voice is emitted; and a structure in which the registration processing means receives from the mobile terminal the guidance identification information transmitted to the mobile terminal by near field communication at the place where the guidance voice is emitted.

An information provision system according to another mode of the present invention further includes: reproduction processing means for supplying to a voice emission portion a sound signal containing a sound component of the guidance voice and a sound component of identification information of the content associated with the guidance voice; and information extraction means for extracting the identification information from the sound signal, and the provision instruction means generates the provision instruction to provide the content specified by the identification information extracted by the information extraction means.

In the above-described mode, the guidance voice is emitted by the supply of the sound signal by the voice emission portion, whereas the identification information contained as the sound component in the sound signal is extracted by the information extraction means and then, the provision instruction is generated. That is, the sound signal is shared by the guidance voice emission by the voice emission portion and the extraction of the identification information by the information extraction means. Therefore, the guidance voice emission by the voice emission portion and the generation of the provision instruction by the provision instruction means (and consequently, the reproduction of the content by the mobile terminal) can be easily and surely interlocked.

An information provision system according to an example of the structure using the sound signal containing the sound component of the guidance voice and the sound component of the identification information includes a management terminal including the information extraction means and the provision instruction means, and the reproduction processing means transmits the sound signal to the management terminal by cable.

In the above-described mode, the sound signal containing the sound component of the guidance voice and the sound component of the identification information is transmitted from the reproduction processing means to the management terminal by cable. Therefore, an advantage is obtained in that the identification information can be highly accurately identified from the sound signal even when the sound volume of the sound component is sufficiently suppressed so that the sound component of the identification information is difficult to be perceived.

In the example of the structure using the sound signal containing the sound component of the guidance voice and the sound component of the identification information, the sound signal is a signal obtained by synthesizing, of an original sound signal representative of the guidance voice, a first sound signal where a sound component of an available band over a predetermined width from an upper limit of a band of reproduction by the voice emission portion to a low-frequency side is suppressed and a second sound signal representative of the identification information as the sound component in the available band.

In the above-described mode, since of the original sound signal of the guidance voice, the sound component of the available band with which the sound component of the identification information D is synthesized is suppressed, an advantage is obtained in that the identification information can be highly accurately identified from the sound signal even when the sound volume of the sound component of the identification information is sufficiently suppressed.

In the information provision system according to the above-described modes, the content may represent a character string associated with the guidance voice.

In the information provision system according to the above-described modes, the content may represent a character string or a voice which is a translation of a language of a vocal content of the guidance voice to another language.

The information provision system according to the above-described modes further includes an operation portion that accepts an operation by an administrator, and the provision instruction means generates the provision instruction to provide the content associated with the guidance voice by the operation on the operation portion by the administrator.

The information provision system according to the above-described modes further includes a voice collection portion that collects a voice generated by the administrator, and the provision instruction means generates the provision instruction to provide the content associated with the guidance voice when the voice collection portion collects the voice uttered by the administrator.

The information provision system according to the above-described modes is not only implemented by a dedicated electronic circuit but also implemented by a cooperation between a general-purpose arithmetic processing unit such as a CPU (central processing unit) and a program. The program of the present invention may be provided in a mode of being stored in a computer-readable recording medium and installed on a computer. While the recording medium is, for example, a non-transitory recording medium and a good example is an optical recording medium (optical disk) such as a CD-ROM, recording media of given known formats such as a semiconductor recording medium and a magnetic recording medium may be embraced. For example, the program of the present invention may be provided in a mode of distribution through a communication network and being installed on a computer.

Moreover, the present invention may be identified as an operation method of the information provision system (information provision method) according the above-described modes. Specifically, the information provision method according to a preferred mode of the present invention embraces: generating a provision instruction to provide a content associated with a guidance voice every emission of the guidance voice; and transmitting distribution information for reproducing the content related to the provision instruction, to a mobile terminal registered as a target of provision of the content associated with the guidance voice.

Moreover, the management terminal of the present invention includes: information extraction means for extracting identification information of a content associated with a guidance voice, from a sound signal; and provision instruction means for generating a provision instruction to provide a content specified by the identification information extracted by the information extraction means every emission of the guidance voice.

REFERENCE SIGNS AND NUMERALS ARE LISTED BELOW

100: Information provision system;
200: signal processing device;
12: voice guidance device;
14: management terminal;
16: information provision device;
18: communication network;
20: mobile terminal;
32: reproduction processing portion;
322: control portion;
324: storage portion;
326: operation portion;
34: voice emission portion;
36: voice collection portion;
42: control portion;
422: component suppression portion;
424: modulation processing portion;
426: mixing processing portion;
44: storage portion;
51: control portion;
512: information extraction portion;
514: provision instruction portion;
516: emission instruction portion;
518: voice analysis portion;
52: storage portion;
53: communication portion;
54: operation portion;
55: reception portion;
56: voice collection portion;
61: control portion;
612: reproduction control portion;
614: information obtaining portion;
62: storage portion;
63: communication portion;
64: operation portion;
65: reproduction portion;
66: imaging portion;
67: radio reception portion;
72: control portion;
722: registration processing portion;
724: information distribution portion;
74: storage portion;
76: communication portion.

What is claimed is:

1. An information provision system that emits a guidance voice, the information provision system comprising:
 at least one memory storing instructions; and
 at least one processor configured to implement the stored instructions to execute a plurality of tasks, including:
  a supplying task that supplies a sound signal containing a sound component of the guidance voice and a sound component of identification information of a content associated with the guidance voice;
  an extracting task that extracts the identification information from the sound signal;
  a generating task that generates provision instruction information to provide the content associated with each emission of the guidance voice; and
  a transmitting task that causes distribution information for reproducing the content according to the provision instruction information to be transmitted to a mobile terminal, which is registered as a target of provision of the content associated with the guidance voice.

2. The information provision system according to claim 1, wherein the plurality of tasks include:
 a receiving task that receives, from the mobile terminal, guidance identification information obtained by the mobile terminal at a place where the guidance voice is emitted; and
 a registration task that registers the mobile terminal as the target of provision of the content associated with the guidance voice of a guidance target specified by the guidance identification information.

3. The information provision system according to claim 1 further comprising:
 a voice emission device that emits a guidance voice,
 wherein the supplying task supplies the sound signal to the voice emission device.

4. The information provision system according to claim 1, further comprising:
 a management terminal,
 wherein the at least one processor includes a first processor and a second processor,
 wherein the management terminal includes the second processor that executes the extracting task and the generating task, and
 wherein the management terminal receives the sound signal via a cable.

5. The information provision system according to claim 4, wherein the sound signal is a signal obtained by synthesizing, of an original sound signal representative of the guidance voice, a first sound signal where a sound component of an available band over a predetermined width from an upper limit of a band of reproduction by the voice emission portion to a low-frequency side is suppressed and a second sound signal representative of the identification information as the sound component in the available band.

6. The information provision system according to claim 1, wherein the content represents a character string associated with the guidance voice.

7. The information provision system according to claim 1, wherein the content represents a character string or a voice, which is a translation of a language of a vocal content of the guidance voice to another language.

8. The information provision system according to claim 1, further comprising:
an input device that accepts an operation by an administrator,
wherein the provision instruction information is generated to provide the content associated with the guidance voice based on the operation on the operation portion by the administrator.

9. The information provision system according to claim 1, further comprising:
a voice input device that collects a voice uttered by the administrator,
wherein the provision instruction information is generated to provide the content associated with the guidance voice when the voice input device collects the voice uttered by the administrator.

10. An information provision method comprising the steps of:
supplying a sign signal containing a sound component of the guidance voice and a sound component of identification information of a content associated with the guidance voice;
extracting the identification information from the sound signal;
generating provision instruction information to provide the content associated with each emission of the guidance voice; and
transmitting distribution information for reproducing the content according to the provision instruction information to be transmitted to a mobile terminal, which is registered as a target of provision of the content associated with the guidance voice.

11. A management terminal comprising:
a memory storing instructions; and
a processor configured to implement the stored instructions to execute a plurality of tasks, including:
a receiving task that receives a sound signal containing a sound component of a guidance voice and a sound component of identification information of a content associated with the guidance voice;
an extracting task that extracts the identification information from the sound signal;
a generating task that generates provision instruction information to provide the content associated with each emission of the guidance voice; and
a transmission task that causes distributed information for reproducing the content according to the provision instruction information to be transmitted to a mobile terminal, which is registered as a target of provision of the content associated with the guidance voice.

* * * * *